(12) United States Patent
Kim et al.

(10) Patent No.: US 11,835,833 B2
(45) Date of Patent: Dec. 5, 2023

(54) ELECTROCHROMIC DEVICE

(71) Applicant: LG CHEM, LTD., Seoul (KR)

(72) Inventors: Yong Chan Kim, Daejeon (KR); Ki Hwan Kim, Daejeon (KR); Pil Sung Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 423 days.

(21) Appl. No.: 16/604,496

(22) PCT Filed: Apr. 23, 2018

(86) PCT No.: PCT/KR2018/004667
§ 371 (c)(1),
(2) Date: Oct. 10, 2019

(87) PCT Pub. No.: WO2018/199567
PCT Pub. Date: Nov. 1, 2018

(65) Prior Publication Data
US 2020/0159080 A1    May 21, 2020

(30) Foreign Application Priority Data

Apr. 27, 2017   (KR) .................... 10-2017-0054316
Apr. 19, 2018   (KR) .................... 10-2018-0045414

(51) Int. Cl.
*G02F 1/155*     (2006.01)
*H01B 1/02*      (2006.01)
*G02F 1/1523*    (2019.01)

(52) U.S. Cl.
CPC .............. *G02F 1/155* (2013.01); *H01B 1/02* (2013.01); *G02F 1/1525* (2013.01); *G02F 2001/1555* (2013.01); *G02F 2203/02* (2013.01)

(58) Field of Classification Search
CPC ................ G02F 1/155; G02F 1/1525; G02F 2001/1555; G02F 2203/02; H01B 1/02
USPC .......................................................... 359/267
See application file for complete search history.

(56) References Cited

U.S. PATENT DOCUMENTS

| 6,023,364 A | 2/2000 | Kobayashi et al. |
|---|---|---|
| 9,357,636 B2 | 5/2016 | Lim et al. |
| 9,903,989 B2 | 2/2018 | Kim et al. |
| 10,057,979 B2 | 8/2018 | Koo et al. |
| 2002/0044331 A1* | 4/2002 | Agrawal .............. H01M 14/005 359/254 |

(Continued)

FOREIGN PATENT DOCUMENTS

| EP | 2 747 093 B1 | 3/2017 |
|---|---|---|
| JP | 51-6065 A | 1/1976 |

(Continued)

OTHER PUBLICATIONS

Wikipedia webpage "Electrical resistivity and conductivity" (Year: 2017).*

(Continued)

*Primary Examiner* — George G. King
(74) *Attorney, Agent, or Firm* — Birch, Stewart, Kolasch & Birch, LLP

(57) ABSTRACT

An electrochromic device having a conductive layer having reflectiveness and light absorption characteristics simultaneously. The device is capable of realizing various esthetic senses, color senses or stereoscopic color patterns, and at the same time has excellent durability.

11 Claims, 3 Drawing Sheets a conductive layer
an electrochromic layer
an electrolyte layer
a light-transmitting counter electrode layer

(56) References Cited

U.S. PATENT DOCUMENTS

| | | | |
|---|---|---|---|
| 2004/0233537 A1 | 11/2004 | Agrawal et al. | |
| 2007/0206263 A1* | 9/2007 | Neuman | G02F 1/153 359/267 |
| 2011/0080629 A1* | 4/2011 | Neuman | G02F 1/155 359/265 |
| 2012/0236386 A1* | 9/2012 | Mehtani | G02F 1/163 359/245 |
| 2014/0085700 A1 | 3/2014 | Park | |
| 2014/0139902 A1* | 5/2014 | Baumann | G02F 1/155 359/275 |
| 2014/0185124 A1 | 7/2014 | Tsai et al. | |
| 2015/0075596 A1* | 3/2015 | Lim | H05K 3/16 204/192.15 |
| 2015/0301423 A1* | 10/2015 | Orillard | B32B 17/10201 359/275 |
| 2016/0091767 A1* | 3/2016 | Agrawal | G02F 1/161 359/267 |
| 2016/0147125 A1 | 5/2016 | Theodore | |
| 2016/0282695 A1 | 9/2016 | Agrawal et al. | |
| 2019/0137841 A1* | 5/2019 | Koo | G09G 3/38 |
| 2019/0159339 A1 | 5/2019 | Lee et al. | |

FOREIGN PATENT DOCUMENTS

| | | |
|---|---|---|
| JP | 60-82659 A | 5/1985 |
| JP | 6-52354 A | 2/1994 |
| JP | 11-38454 A | 2/1999 |
| JP | 2000-235198 A | 8/2000 |
| JP | 2004-205628 A | 7/2004 |
| JP | 2005-70590 A | 3/2005 |
| JP | 2009-299160 A | 12/2009 |
| JP | 2010-79240 A | 4/2010 |
| JP | 2011-107697 A | 6/2011 |
| JP | 2014-512455 A | 5/2014 |
| JP | 2014-513335 A | 5/2014 |
| JP | 2015-503182 A | 1/2015 |
| JP | 2015-533678 A | 11/2015 |
| KR | 10-2006-0092362 A | 8/2006 |
| KR | 10-2008-0040439 A | 5/2008 |
| KR | 10-2014-0020443 A | 2/2014 |
| KR | 10-2014-0041117 A | 4/2014 |
| KR | 10-2015-0090460 A | 8/2015 |
| KR | 10-2016-0115064 A | 10/2016 |
| KR | 20170029838 A * | 3/2017 ............... G03F 7/00 |
| WO | WO 2016/195367 A1 | 12/2016 |

OTHER PUBLICATIONS

Wikipedia webpage "Thin-film interference" (Year: 2017).*
International Search Report issued in PCT/KR2018/004667 (PCT/ISA/210), dated Jul. 26, 2018.
European Search Report for Appl. No. 18790856.1 dated Jan. 24, 2020.
Communication Pursuant to Article 94(3) EPC dated May 31, 2021, in European Patent Application No. 18 790 856.1.

* cited by examiner

[Figure 1]
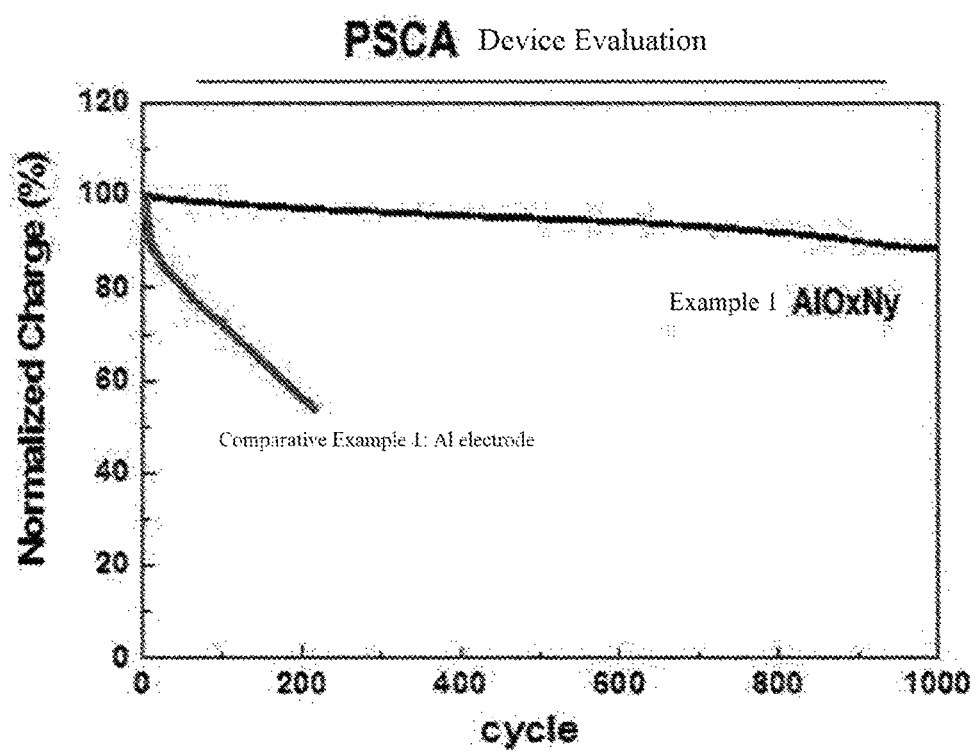

[Figure 2]
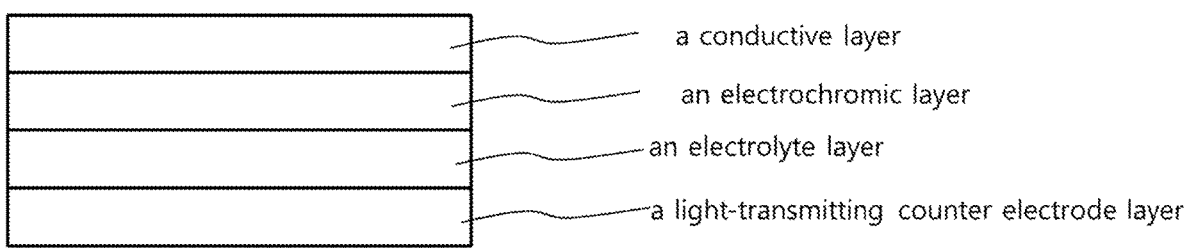

[FIGURE 3]
| | AlOxNy Layer | | | Specific Resistance (Ω·cm) | Color | |
|---|---|---|---|---|---|---|
| | Elemental Content (atomic %) | Relation Equation Value | Thickness (nm) | | | |
| Production Example 1 | Al: 58.8±0.1<br>O: 2.0±0.7<br>N: 39.2±0.7 | 1.5 | 54.6 | $3 \times 10^{-4}$ |  | Gray |
| Production Example 2 | Al: 58.5±0.6<br>O: 3.0±1.7<br>N: 38.5±1.2 | 1.4 | 87.3 | $2 \times 10^{-4}$ |  | Light brown |
| Production Example 3 | Al: 57.6±0.5<br>O: 5.9±1.3<br>N: 36.5±0.8 | 1.4 | 108.5 | $5 \times 10^{-5}$ | 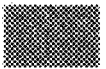 | Gold |

ELECTROCHROMIC DEVICE

CROSS-REFERENCE TO RELATED APPLICATIONS

This application claims the benefit of priority based on Korean Patent Application No. 10-2017-0054316 filed on Apr. 27, 2017 and Korean Patent Application No. 10-2018-0045414 filed on Apr. 19, 2018, the disclosures of which are incorporated herein by reference in their entirety.

TECHNICAL FIELD

The present application relates to an electrochromic device.

BACKGROUND ART

Electrochromism refers to a phenomenon in which an optical property of an electrochromic material is changed by an electrochemical oxidation or reduction reaction, where the device using the phenomenon is referred to as an electrochromic device. The electrochromic device generally comprises a working electrode, a counter electrode and an electrolyte, where optical properties of each electrode can be reversibly changed by an electrochemical reaction. For example, the working electrode or the counter electrode may comprise a transparent conductive material and an electrochromic material in the form of devices, respectively, and in the case where a potential is applied to the device, as the electrolyte ions are inserted into or removed from the electrochromic material-containing device and the electrons simultaneously move through an external circuit, the optical property changes of the electrochromic material appear.

General electrochromic devices do not partly meet market demands for various colors or superior esthetic senses because the colors implemented by the devices are solely dependent on the electrochromic materials.

DISCLOSURE

Technical Problem

It is one object of the present application to provide a reflective electrochromic device capable of realizing various color senses or stereoscopic color patterns.

It is another object of the present application to provide a reflective electrochromic device having excellent durability.

The above and other objects of the present application can be all solved by the present application which is described in detail below.

Technical Solution

In one example of the present application, the present application relates to an electrochromic device. The electrochromic device is a so-called "reflective" electrochromic device, the constitution of which is different from that of a general transmissive electrochromic device comprising a light-transmitting electrode material and a light-transmitting base material on both lateral surfaces of the device. Specifically, according to one embodiment of the present application, the present application can use a conductive layer having light absorption characteristics and reflectiveness simultaneously, instead of light transmission characteristics. The conductive layer having light absorption characteristics provides the electrochromic device with excellent esthetic senses and color implementation characteristics. For example, in the case of a conventional electrochromic element comprising only a configuration corresponding to the electrochromic layer, the change in optical characteristics of the element generally depends on the inherent color itself expressed by the electrochromic material. However, the device of the present application comprising a conductive layer having reflectiveness and absorbency to light simultaneously, in addition to the electrochromic layer, can provide additional optical property changes in addition to color changes by the electrochromic layer.

The reflective electrochromic device of the present application may comprise a conductive layer, an electrochromic layer, an electrolyte layer and a light-transmitting counter electrode layer sequentially. These layers are sequentially shown in FIG. 2.

In one example, the conductive layer is a light absorbing layer having superior light absorption characteristics than light transmission characteristics, and at the same time, it can have a characteristic of a reflective layer having lower reflectiveness than a metal, but having appropriate reflectiveness. The conductive layer can alter, adjust, or change colors or color senses shown by the colored or bleached electrochromic layer. It is considered that this alteration, adjustment or change is realized by optical interference by the conductive layer. Specifically, the conductive layer of the present application absorbs light in both an incident path and a reflex path of light due to its light absorption characteristics. Furthermore, since the conductive layer has appropriate reflectiveness, reflection occurs both on the surface of the conductive layer and at the interfaces with the adjacent layers. Therefore, additional color changes or esthetic senses can be added by constructive interference and destructive interference occurring between the reflected lights. Accordingly, the electrochromic device of the present application may allow a color, a color sense or a color pattern, which is different from the color expressed in the electrochromic layer, to be viewed by the user The conductive layer may comprise a metal oxide, a metal nitride or a metal oxynitride. In one example, the conductive layer may have a single layer structure comprising a metal oxide, a metal nitride or a metal oxynitride. The conductive layer comprising the material may have appropriate light absorption characteristics and reflectiveness. Considering the reflection characteristic of the conductive layer and its interference effect, it is possible to consider using pure metal as the conductive layer material, but the pure metal material has a large degree of deterioration by electrolyte ions, so that the durability of the element may be lowered.

In one example, the conductive layer may comprise an oxide, a nitride or an oxynitride containing one or more metals of nickel (Ni), chromium (Cr), iron (Fe), cobalt (Co), titanium (Ti), vanadium (V), aluminum (Al), gold (Au), copper (Cu), silver (Ag), molybdenum (Mo) and an alloy thereof. More specifically, the conductive layer may comprise a nitride or an oxynitride containing one or more selected from molybdenum (Mo), titanium (Ti), aluminum (Al) and copper (Cu).

In one example, the conductive layer may comprise $CuO_xN_y$ ($0 \leq x \leq 1$, $0 \leq y \leq 1$, $x+y>0$). At this time, x and y may mean ratios of atomic numbers of oxygen (O) and nitrogen (N) to one atom of copper (Cu), respectively.

In another example, the conductive layer may comprise a nitride or an oxynitride containing both molybdenum and titanium. More specifically, the conductive layer may comprise $MoTi_aO_xN_y$ ($0<a \leq 2$, $0 \leq x \leq 3$, $0 \leq y \leq 2$, $x+y>0$). At this time, a, x and y mean ratios of atomic numbers of titanium (Ti), oxygen (O) and nitrogen (N) to one atom of molybdenum (Mo), respectively.

In another example, the conductive layer may comprise a nitride or an oxynitride of aluminum (Al). More specifically, the conductive layer may comprise $AlO_xN_y$ ($0 \leq x \leq 1.5$, $0 \leq y \leq 1$, $x+y>0$) satisfying the following relation equation.

$$1 < \frac{(\text{aluminum elemental content}) \times 3}{(\text{oxygen elemental content}) \times 2 + (\text{nitrogen elemental content}) \times 3} < 2 \quad \text{[Relation Equation]}$$

However, in $AlO_xN_y$, x and y mean ratios of atomic numbers of O and N to one atom of Al, respectively. Then, in Relation Equation above, based on 100% of all elemental contents contained in $AlO_xN_y$, the (aluminum elemental content) represents the elemental content (atomic %) of Al, the (oxygen elemental content) represents the elemental content (atomic %) of O, and the (nitrogen elemental content) represents the elemental content (atomic %) of N.

The above relation equation is an equation considering the elemental content (atomic %) and the chemical valence measured by XPS (X-ray photoelectron spectroscopy). The chemical valence of Al is 3, the chemical valence of O is 2, and the chemical valence of N is 3. When the value of the above relation equation is larger than 1, it means that Al is rich among Al, O and N; and when the value is 1 or less, it means that Al is lack among Al, O and N. For example, $Al_2O_3$ or AlN stoichiometrically represents a relatively transparent phase, and the value of the relation equation is 1. In such a case, it is difficult to perform the above-mentioned function of the conductive layer. On the other hand, if the value obtained in the above relation equation is larger than 2, the content of Al becomes higher and the metal property becomes strong, so that the reflectiveness becomes high and it is difficult to perform the above-mentioned function of the conductive layer.

Without being particularly limited, the conductive layer may have a thickness in a range of 5 nm to 500 nm. In the present application, the "thickness" may mean, when a virtual normal line is drawn from the ground toward the device, "a normal distance between any point on the layer that meets the normal line and the opposite surface point of the relevant layer" or "the average normal distance between one side of the measuring object layer and the other side facing it." In one embodiment, the conductive layer may have a thickness gradient.

In another example, the conductive layer may have curvature or unevenness. The cross-sectional shape of the curvature or unevenness is not particularly limited, which may be, for example, a part of a circle, or a part of a triangle or a quadrilateral. When the curvature or unevenness is repeated, interference of various paths may occur, so that the conductive layer can impart various color patterns to the electrochromic device.

In another example, one side of the conductive layer may have a regular or irregular pattern. The form of the pattern is not particularly limited. By the regular or irregular pattern, interference of various paths can occur in the conductive layer, and accordingly, the conductive layer can impart various color patterns to the electrochromic device.

In one example, the conductive layer may have a refractive index in a range of 0 to 3.

In one example, the conductive layer may have an extinction coefficient value k in a range of 0.2 to 2.5. More specifically, the conductive layer may have an extinction coefficient in the range of 0.2 to 1.5 or 0.2 to 0.8. The extinction coefficient k is also called an absorption coefficient, which is a measure for determining how much a structure can absorb light or a ray at a particular wavelength. For example, when k is less than 0.2, it is transparent, so that the degree of light absorption is insignificant. On the contrary, when the metal component content of the conductive layer is increased, the reflection characteristic becomes dominant, and the value of k becomes more than 2.5. In the case of having the extinction coefficient in the above range, the conductive layer has appropriate light absorption characteristics and reflectiveness, so that the intended interference effect can be efficiently performed in the present application.

In one example, the conductive layer may have specific resistance of $5 \times 10^{-4}$ $\Omega \cdot$cm or less. When it has the specific resistance in the above range, the electrochromism rate can be improved. In this specification, the resistance, specific resistance or sheet resistance can be measured using a known surface resistor in accordance with a 4-point probe method. The sheet resistance is obtained by measuring a current (I) and a voltage (V) with four probes to determine a resistance value (V/I) and then calculating sheet resistance (V/I×W/L) using an area (cross-sectional area, W) of a sample and a distance (L) between electrodes for measuring the resistance, and multiplying it by a resistance correction factor (RCF) for calculating ohm/square as the sheet resistance unit. The resistance correction factor can be calculated using the size of the sample, the thickness of the sample, and the temperature at the time of measurement, which can be calculated by Poisson's equation. The sheet resistance of the entire laminate can be measured and calculated in the laminate itself, and the sheet resistance of each layer can be measured before forming a layer made of the remaining materials excluding the target layer to be measured in the whole laminate, can be measured after removing a layer made of the remaining materials excluding the target layer to be measured in the whole laminate, or can be measured after analyzing the material of the target layer and forming a layer under the same conditions as the target layer.

The method of providing the conductive layer is not particularly limited. For example, the conductive layer can be formed using a known wet or dry method. More specifically, the conductive layer can be formed using sputtering, CVD (chemical vapor deposition), or an electron beam (e-beam).

The electrochromic layer may comprise a electrochromic material that an optical characteristic, that is, a color change through a reversible oxidation-reduction reaction. The kind of the electrochromic material is not particularly limited.

In one example, the electrochromic layer may comprise a reducing electrochromic material that is colored when a reduction reaction occurs. The type of the reducing electrochromic material is not particularly limited, but for example, the reducing electrochromic material may be an oxide of Ti, Nb, Mo, Ta or W such as $WO_3$, $MoO_3$, $Nb_2O_5$, $Ta_2O_5$ or $TiO_2$.

In another example, the electrochromic layer may comprise a material having a different coloring property from the reducing electrochromic material, that is, an oxidizing electrochromic material. The type of the oxidizing electrochromic material is also not particularly limited, but for example, the oxidizing electrochromic material may be one or more materials selected from an oxide of Cr, Mn, Fe, Co, Ni, Rh or Ir, such as LiNiOx, IrO$_2$, NiO, V$_2$O$_5$, LixCoO$_2$, Rh$_2$O$_3$ or CrO$_3$; a hydroxide of Cr, Mn, Fe, Co, Ni, Rh or Ir; and prussian blue.

The electrochromic layer may be provided using a known method, for example, various types of wet or dry coating methods.

Without being particularly limited, the electrochromic layer may have a thickness in a range of 30 nm to 500 nm.

The electrolyte layer is a structure for providing electrolyte ions involved in the electrochromic reaction to the electrochromic layer. The type of the electrolyte is not particularly limited. For example, a liquid electrolyte, a gel polymer electrolyte or an inorganic solid electrolyte may be used without limitation.

The specific composition of the electrolyte used in the electrolyte layer is not particularly limited as long as it can provide electrolyte ions involved in electrochromic of the electrochromic layer or an ion storage layer to be described below. In one example, the electrolyte layer may comprise a metal salt capable of providing electrolyte ions such as H$^+$, Li$^+$, Na$^+$, K$^+$, Rb$^+$ or Cs$^+$. More specifically, the electrolyte layer may comprise a lithium salt compound such as LiClO$_4$, LiBF$_4$, LiAsF$_6$ or LiPF$_6$, or a sodium salt compound such as NaClO$_4$.

In one example, the electrolyte layer may further comprise a carbonate compound as a solvent. Since the carbonate-based compound has a high dielectric constant, ion conductivity can be increased. As a non-limiting example, a solvent, such as PC (propylene carbonate), EC (ethylene carbonate), DMC (dimethyl carbonate), DEC (diethyl carbonate) or EMC (ethylmethyl carbonate), may be used as the carbonate-based compound.

The counter electrode layer may have a light transmission characteristic. In the present application, the "light transmission characteristic" may mean, for example, a case where the transmittance to visible light is 60% or more, specifically 60% to 95%. At this time, the visible light may mean light in a wavelength range of 380 nm to 780 nm, specifically, light having a wavelength of about 550 nm. The transmittance can be measured by a known method or apparatus, for example, a haze meter or the like. The transmittance can be equally applied to the electrolyte layer.

The kind of the material usable for the counter electrode layer is not particularly limited as long as it has a light transmission characteristic. For example, a transparent conductive oxide having a light transmission characteristic, or a metal mesh or an OMO (oxide/metal/oxide) may be used for the counter electrode layer. At this time, since the OMO can provide lower sheet resistance than the transparent conductive oxide typified by ITO, it can contribute to improvement of the color-switching speed of the element.

As a transparent conductive oxide usable for the counter electrode layer, for example, ITO (indium tin oxide), In$_2$O$_3$ (indium oxide), IGO (indium gallium oxide), FTO (fluorodo doped tin oxide), AZO (aluminum doped zinc oxide), GZO (gallium doped zinc oxide), ATO (antimony doped tin oxide), IZO (indium doped zinc oxide), NTO (niobium doped titanium oxide) or ZnO (zinc oxide), can be used.

The metal mesh usable for the counter electrode layer may have a lattice form including Ag, Cu, Al, Mg, Au, Pt, W, Mo, Ti, Ni or an alloy thereof. However, the material usable for the metal mesh is not limited to the above-listed metal materials.

The OMO usable for the counter electrode layer may comprise an upper layer, a lower layer and a metal layer therebetween. In one example, the upper and lower layers may comprise an oxide of one or more metals selected from the group consisting of Sb, Ba, Ga, Ge, Hf, In, La, Se, Si, Ta, Se, Ti, V, Y, Zn and Zr. In addition, the metal layer of the OMO may comprise a metal such as Ag, Cu, Zn, Au or Pd.

Without being particularly limited, the counter electrode layer may have a thickness of 50 nm to 400 nm or less.

In one example, the electrochromic device of the present application may further comprise an ion storage layer between the electrolyte layer and the light-transmitting counter electrode layer. The ion storage layer may mean a layer formed to match charge balance with the electrochromic layer upon oxidation and reduction reactions for electrochromism.

The ion storage layer may comprise an electrochromic material having a coloring property different from that of the electrochromic material used in the electrochromic layer. For example, when the electrochromic layer comprises a reducing electrochromic material, the ion storage layer may comprise an oxidizing electrochromic material. Also, the opposite is possible.

In one example, the electrochromic device of the present application may further comprise a passivation layer. The passivation layer can prevent deterioration due to side reactions between electrolyte ions and metal components contained in the conductive layer.

In one example, the passivation layer may comprise a transparent conductive oxide. As the transparent conductive oxide, the above-mentioned materials may be used.

In one example, the passivation layer may be located on the lateral surface of the conductive layer, for example, between a light-transmitting base material to be described below and the conductive layer, or may be located between the electrochromic layer and the conductive layer, or between the electrochromic layer and the electrolyte layer.

In one example, the electrochromic device may further comprise a light-transmitting base material on the outermost side of the device. For example, the light-transmitting base material may be located on the lateral surface of the conductive layer and/or the counter electrode layer. The transmittance of the light transmitting base material may be the same as that of the counter electrode layer as described above.

In one example, the type of the light-transmitting base material is not particularly limited, but for example, glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)), or a polyolefin film such as PE (polyethylene) or PP (polypropylene), and the like can be used as a light-transmitting base material.

In another example, the electrochromic device may further comprise a power source. The manner of electrically connecting the power source to the device is not particularly limited, which may be suitably performed by those skilled in the art.

In one example of the present application, the present application relates to an apparatus, instrument or appliance comprising the device. The type of the apparatus or instrument is not particularly limited, but may be, for example, a shell of a computer or a mobile phone, a wearable appliance such as a smart watch or smart clothing, or a construction material such as a window. The device can be used as a decorative film in these apparatuses, instruments or appliances.

Advantageous Effects

According to one example of the present application, an electrochromic device capable of realizing various esthetic senses, color senses or stereoscopic color patterns, and having excellent durability simultaneously, and an apparatus or an instrument comprising the same can be provided.

BRIEF DESCRIPTION OF DRAWINGS

FIG. 1 is a graph recording driving characteristics of Example and Comparative Example.

FIG. 2 is a schematic representation of an electrochromic device of an embodiment of the present invention.

FIG. 3 is a table showing the results from Production Examples 1-3.

BEST MODE

Hereinafter, the present application will be described in detail through Examples. However, the scope of protection of the present application is not limited by Examples to be described below.

Experimental Example 1: Confirmation of Color Expression of Conductive Layer

Production Example 1

Using sputtering deposition, a laminate in which an AlOxNy layer having a thickness of 54.6 nm was laminated with transparent PET was produced. The specific resistance and the viewed color that the laminate has are as shown in FIG. 3.

Production Examples 2 to 3

A laminate was produced in the same manner, except that the thickness of the $AlO_xN_y$ layer was changed as shown in Table 1 below.

Experimental Example 2: Confirmation of Driving Characteristics of the Device

The values related to the experiment were measured using the following method or apparatus.

<Charge Quantity Measurement>

Charge quantity changes of each device in Example and Comparative Example were measured using potential step chronoamperometry (PSCA) with a potentiostat device while increasing the driving cycle.

Example 1

A film in which a 250 nm thick WO$_3$ layer was laminated on the conductive layer of Production Example 3 was produced. An electrolytic solution (LiClO$_4$ (1M)+propylene carbonate (PC)) and a potentiostat device were prepared and a voltage of −1V was applied for 50 seconds to color WO$_3$.

The film was bonded to a Prussian blue (PB)/ITO laminate together via a gel polymer electrolyte (GPE) to produce a film having a laminated structure of AlO$_x$N$_y$/WO$_3$/GPE/PB/ITO.

The electrochromic speed (color-switching speed) was measured while repeatedly applying a bleaching voltage and a coloring voltage to the produced film at a constant cycle. The bleaching voltage and the coloring voltage per one cycle were applied for 50 seconds at a magnitude of (±) 1.2V, respectively. The results are as shown in FIG. 1.

Comparative Example 1

An electrochromic device was produced by the same method and configuration, except that Al (metal layer) having the same thickness was used instead of the conductive layer of Example 1, and the driving characteristics were observed in the same manner.

It can be seen from FIG. 1 that the number of drivable cycles of the electrochromic device of Comparative Example 1 using the metal electrode is significantly smaller than that of the device of Example using the metal oxynitride. It can be seen from Example above that the present application can provide unique esthetic senses by using the conductive layer material having appropriate reflectiveness and light absorption characteristics at the same time, while securing excellent durability by preventing the deterioration of the electrode material which occurs upon using the pure metal layer.

The invention claimed is:

1. A reflective electrochromic device, comprising:
a conductive layer;
an electrochromic layer;
an electrolyte layer; and
a light-transmitting counter electrode layer sequentially, wherein the conductive layer comprises AlOxNy (0<x≤1.5, 0<y≤1, x+y>0) satisfying the Relation Equation below:

$$1 < \frac{(\text{aluminum elemental content}) \times 3}{(\text{oxygen elemental content}) \times 2 + (\text{nitrogen elemental content}) \times 3} < 2$$

wherein, in AlOxNy, x and y mean ratios of atomic numbers of O and N to one atom of Al, respectively and in the Relation Equation above, based on 100% of all elemental contents contained in AlOxNy, the (aluminum elemental content) represents the elemental content (atomic %) of Al, the (oxygen elemental content) represents the elemental content (atomic %) of O, and the (nitrogen elemental content) represents the elemental content (atomic %) of N,
wherein the elemental content (atomic %) of oxygen in the AlOxNy is from 2.0±0.7 to 5.9±1.3 or wherein the elemental content (atomic %) of nitrogen in the AlOxNy is from 36.5±0.8 to 39.2±0.7;
wherein a thickness of the conductive layer is from 54.6 nm to 108.5 nm,
wherein applying a voltage change to the conductive layer and the light-transmitting counter electrode layer changes a color of the electrochromic layer in a colored or bleached state,
wherein the conductive layer has both light absorption and reflective characteristics,
wherein the conductive layer has lower reflectiveness than a metal,
wherein the conductive layer reflects light both on a surface of the conductive layer and at the interfaces with the adjacent layers,
wherein the conductive layer alters the color of the electrochromic device, and
the reflective electrochromic device provides a color that is different from the color expressed in the electrochromic layer.

2. The reflective electrochromic device according to claim 1, wherein the conductive layer is a single layer.

3. The reflective electrochromic device according to claim 1, wherein the conductive layer has a thickness in a range from 87.3 nm to 108.5 nm.

4. The reflective electrochromic device according to claim 3, wherein the conductive layer has a thickness gradient.

5. The reflective electrochromic device according to claim 3, wherein the conductive layer has an unevenness.

6. The reflective electrochromic device according to claim 3, wherein the conductive layer has a pattern.

7. The reflective electrochromic device according to claim 1, wherein the conductive layer has an extinction coefficient of 0.2 to 2.5 at a particular wavelength.

8. The reflective electrochromic device according to claim 1, wherein the electrochromic layer comprises a reducing electrochromic material or an oxidizing electrochromic material.

9. The reflective electrochromic device according to claim 8, wherein the reducing electrochromic material, when present, comprises an oxide of Ti, Nb, Mo, Ta or W, or the oxidizing electrochromic material, when present, comprises one or more selected from the group consisting of (a) an oxide of Cr, Mn, Fe, Co, Ni, Rh or Ir; (b) a hydroxide of Cr, Mn, Fe, Co, Ni, Rh or Ir; and (c) prussian blue.

10. The reflective electrochromic device according to claim 8, further comprising an ion storage layer between the electrolyte layer and the light-transmitting counter electrode layer, wherein the ion storage layer comprises an electrochromic material having a coloring property different from a coloring property of the electrochromic material included in the electrochromic layer.

11. The reflective electrochromic device according to claim 1, further comprising a passivation layer between the conductive layer and the electrochromic layer, wherein the passivation layer comprises a transparent conductive oxide.

* * * * *